Dec. 18, 1928.
F. S. STICKNEY
1,695,867
TEMPERATURE MEASURING DEVICE
Filed April 6, 1927
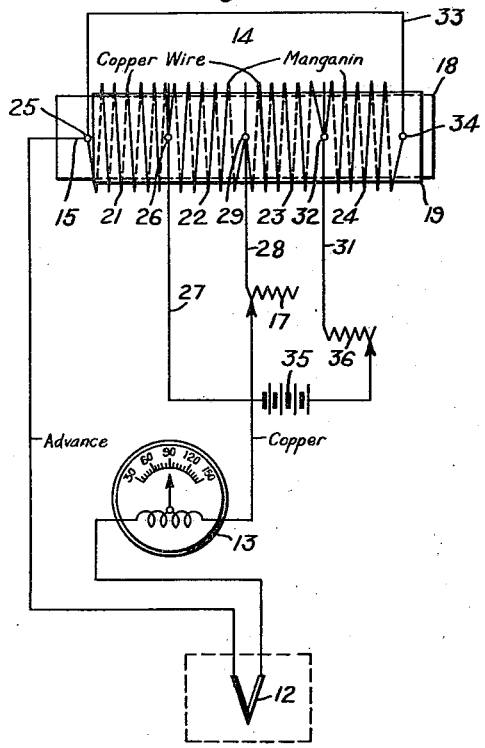
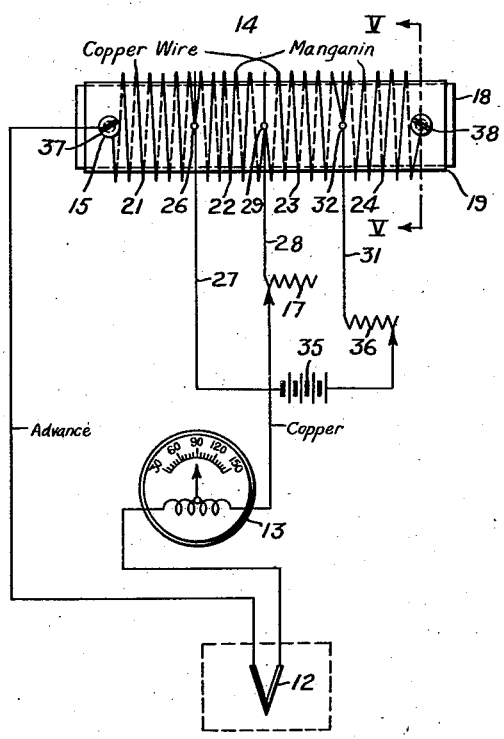
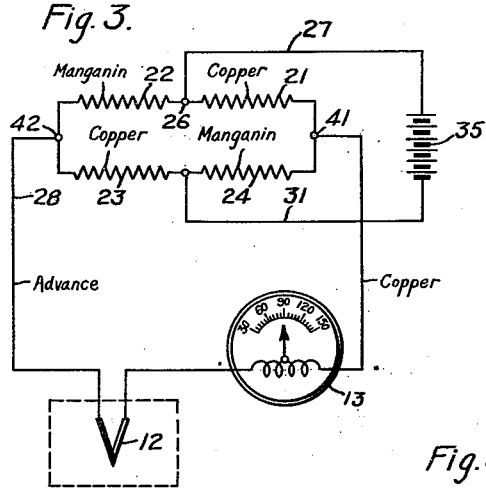
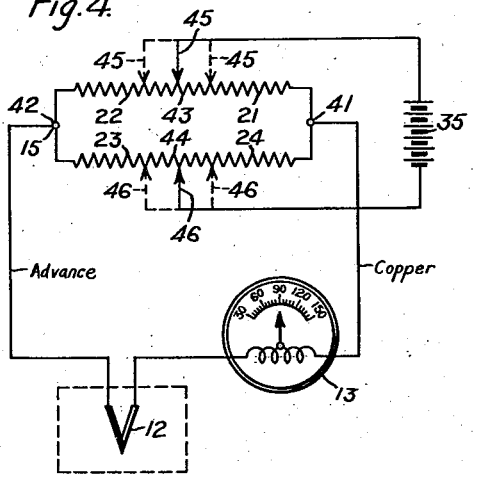
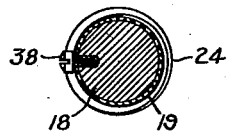
WITNESSES:
INVENTOR
Fernald S. Stickney.
BY
ATTORNEY Patented Dec. 18, 1928.

1,695,867

UNITED STATES PATENT OFFICE.

FERNALD S. STICKNEY, OF PITTSBURGH, PENNSYLVANIA, ASSIGNOR TO WESTINGHOUSE ELECTRIC & MANUFACTURING COMPANY, A CORPORATION OF PENNSYLVANIA.

TEMPERATURE-MEASURING DEVICE.

Application filed April 6, 1927. Serial No. 181,317.

My invention relates to temperature-measuring devices and particularly to thermoelectric temperature-measuring instruments of the direct-indicating type.

An object of my invention is to provide a thermo-electric temperature-measuring device that shall indicate the temperature of the hot junction of a thermo-couple.

Another object of my invention is to provide a thermo-electric measuring device that shall have an instrument connected in circuit with a thermo-couple embodied therein, for indicating the temperature of the hot junction and that shall have electrically energized thermo-responsive means connected to the cold junction, whereby the said instrument will be caused to indicate the hot-junction temperature, regardless of changes in the cold-junction temperature.

And a further object of my invention is to provide a temperature-indicating device that shall be simple in construction, easily manufactured and accurate in its operation.

When measuring temperatures by means of a thermo-couple, it is necessary, in order that the temperature of the hot junction shall be determined, to maintain the temperature of the cold junction constant or to compensate for variations in such temperature, since the thermal-electromotive force that is generated in the thermo-couple is proportional to the difference in temperature between the hot and cold junctions, rather than to the temperature of the hot junction itself.

It is necessary, in order that an instrument connected in circuit with the thermo-couple shall read directly the temperature of the hot junction, either to maintain the temperature of the cold junction constant at some base temperature or to impress an electromotive force on the thermo-couple circuit that is opposite in polarity and equal in magnitude to the electromotive force generated at the cold junction, because the latter electromotive force opposes that generated by the hot junction of the thermo-couple.

In practicing my invention, I provide an instrument to measure the thermal-electromotive force generated in a thermo-couple that is subjected to the temperature of a body or medium to be measured. The instrument is so calibrated that it indicates a certain temperature when the cold and hot junctions of the thermo-couple are at the same temperature. Ordinarily, it may be preferable that the instrument be adjusted to indicate 30 degrees C. when the temperatures of the hot and cold junctions are substantially equal to this temperature.

In order that the instrument shall indicate substantially the temperature of the hot junction at all times, regardless of the variations in the temperature of the cold junction from a base or reference temperature, the cold junction is connected to one of the galvanometer points of a Wheatstone bridge, the bridge being connected in series with the thermo-couple and the instrument and energized from a suitable source of substantially constant electromotive force. When the bridge is in a balanced condition, the galvanometer points thereof are at zero potential. It is desirable, therefore, for purposes of calibration, that the bridge be in a balanced condition when the hot and cold junctions of the thermo-couple are at the base temperature.

The Wheatstone bridge consists of four resistance elements, two of which have a relatively high temperature coefficient of resistance and the remaining two have a relatively low or, preferably, a zero coefficient of resistance. Thus, if the temperature of the cold junction of the thermo-couple increases above the base temperature, the points of the bridge are shifted automatically in a certain direction, whereby an E. M. F. of such value is added to that of the thermo-couple that the instrument indicates substantially the temperature of the hot junction. Conversely, if the temperature of the cold junction falls below the base or reference temperature, the zero-potential points of the bridge are shifted in the opposite direction, whereby an E. M. F. of such value is subtracted from that of the thermocouple that the instrument still indicates substantially the temperature of the hot junction.

To insure that the resistance elements of the Wheatstone bridge and the cold junction of the thermo-couple shall be at the same temperature and to render changes in temperature thereof sluggish, the resistance elements of the bridge are wound on a metallic member having a relatively high thermal capacity, the turns of the elements being electrically insulated therefrom. The cold junction of the thermo-couple is made between the metallic member and an alloy conductor extending from the hot junction. One point of the bridge is connected to the metallic member also. Thus, the cold junction and the resistance elements of the bridge will, at all times, be at a temperature substantially equal to that of the metallic member. Since the thermal-capacity of the metallic member is relatively high, its temperature will not be affected appreciably by variations in ambient temperature of short duration.

In the drawings, Figure 1 is a diagrammatic view of apparatus and circuits embodying my invention.

Fig. 2 is a diagrammatic view of a modification of the apparatus and circuits illustrated in Fig. 1.

Fig. 3 is a schematic illustration of the apparatus and circuits illustrated in Figs. 1 and 2.

Fig. 4 is a view illustrating schematically the operation of the apparatus and circuits illustrated in Figs. 1 to 3, inclusive, and Fig. 5 is a sectional view taken on line V—V of Fig. 2.

In the drawings, a thermo-electric temperature-indicating device comprises a thermo-couple having a hot junction 12, an indicating instrument 13 in circuit therewith and a cold-junction temperature-corrective means 14 located at the cold junction 15 and connected in circuit therewith at that point.

The thermo-couple consists of two conductors of dissimilar metals or alloys joined together at their ends, one metal of which may be some alloy and the other copper, as indicated in Figs. 1 to 4 of the drawings. The copper conductor may be provided with a variable resistor 17, in order that the resistance between the hot junction 12 and the cold junction 15 may be adjusted to the desired value.

The temperature-corrective means 14 comprises a metallic post 18, having a layer of insulation 19 wrapped therearound, and a plurality of resistance elements 21, 22, 23 and 24 wound on the layer of insulation 19. The respective elements 21 to 24, inclusive, constitute the resistance legs of a Wheatstone bridge.

The resistance elements 21 and 23 are preferably of copper and the elements 22 and 24 of manganin, although other metals having dissimilar temperature co-efficients of resistance may be employed.

One end of the resistance element 21 is electrically connected to one end of the post 18 at 25, and the other end thereof is connected, at 26, to a conductor 27 that may be wrapped around the post 18 on the insulation 19 and secured thereto either by twisting the ends thereof together or in any other suitable manner. The ends of the resistance element 22 are connected to the conductor 27 and a conductor 28 at the points 26 and 29, respectively, the conductor 28 being wrapped securely around the insulation of the post 18 and secured thereto by twisting the ends thereof together. Likewise, the ends of the resistance element 23 are connected to the conductor 28 and a conductor 31 at the point 32, the conductor 31 being wrapped around the insulation 19 of the post substantially in the manner as set forth for the conductors 27 and 28.

The ends of the resistance element 24 are connected to the conductor 31 and a conductor 33 at the points 32 and 34, respectively, the conductor 33 being wrapped around the insulation 19 of the post 18. The conductor 33 is connected to the post 18 at the point 25, or some point adjacent thereto.

The advance-metal conductor of the thermo-couple may be secured to the metallic post 18 at the point 25 or at some point adjacent thereto, and the copper conductor may be connected through the instrument 13, to the conductor 28 that is connected to the Wheatstone bridge, as illustrated.

A constant E. M. F., from a source 35, is impressed across the conductors 27 and 31 and may be provided with a resistor 36 in circuit therewith, in order that the current flow through the resistance elements of the Wheatstone bridge may be adjusted to any desired value.

In Fig. 2 of the drawings, a modification of the temperature-corrective means 14 for the cold junction of the thermo-couple is illustrated. As there shown, one end of the resistance element 21 is connected to the post 18 by means of a screw 37 having screw threaded engagement with the post 18, and one end of the resistance element 24 is connected to the post 18 by a screw 38 that also has a screw thread engagement with the post 18. By means of the screws 37 and 38, electrical connection is made between the ends of resistance elements 21 and 24 through the post 18. Thus, the respective resistance elements 21 to 24, inclusive, are electrically connected to form the Wheatstone bridge arrangement, substantially as illustrated in Fig. 3 of the drawings.

Before the resistance elements 21 to 24, inclusive, are connected together at the respective points 26, 29 and 32, the lengths thereof may be adjusted to such values that they may be of substantially equal ohmic resistance at the base temperature. In this particular construction, the resistance of each of the elements may be approximately one-half ohm.

With reference to Fig. 3 of the drawings, the Wheatstone bridge, consisting of the resistance elements 21 and 23 of copper and the elements 22 and 24 of manganin, is connected in series circuit with the thermo-couple at the galvanometer points 41 and 42. When the instrument 13 is calibrated to read directly, the temperature of the hot junction 12 of the thermo-couple, the resistance elements of manganin and copper and the cold junction 15 of the thermo-couple are subjected to the same reference or base temperature, which may be taken to be 30 degrees C.

As the temperature of the hot junction increases, the instrument indicates directly the temperature of the hot junction 12, because the temperature coefficient of resistance of the resistance elements of manganin and copper are such that, in electrical effect, the cold junction is maintained at a constant temperature. If the ambient temperature surrounding the Wheatstone bridge and the cold junction 15 of the theremo-couple increases above the base temperature to a temperature of 35 degrees C. or higher, the resistance of the copper increases as it has a positive temperature coefficient of resistance of a relatively high value, but that of the manganin remains substantially constant for it has a relatively low temperature coefficient of resistance and, for practical purposes, this coefficient is substantially zero.

Since the resistance of the copper elements increases, the point 41 of the Wheatstone bridge becomes more negative and the point 42 more positive; therefore, an E. M. F. is caused to be impressed across the points 41 and 42 that is equal, and opposite in direction, to the electromotive force generated by the cold junction of the thermo-couple. Thus, the instrument 13 still indicates the temperature of the hot junction 12.

Conversely, if the temperature of the cold junction and the resistance elements of copper and manganin decrease to a value of 25 degrees C., or lower, the resistance of the copper elements decreases in value, with respect to that of the manganin elements; therefore, the polarity of the point 42 becomes more negative and that of the point 41 more positive, and, an E. M. F. is caused to be impressed across the points 41 and 42 of the bridge that opposes the increase in E. M. F. between the cold and hot junctions of the thermo-couple, caused by the departure in temperature from the cold junction from that of the standard or base temperature of 30 degrees C. It is evident, therefore, that the instrument 13 again reads substantially the temperature of the hot junction 12.

Since the galvanometer point 42 is thermally and electrically connected to the metallic post 18, changes in temperature of the resistance elements 21 to 24, inclusive, and of the cold junction 15 of the thermo-couple are rendered sluggish. Therefore, variations in ambient temperature of short duration have little or no effect upon the temperature of the bridge and the cold junctin connected thereto.

In Fig. 4 of the drawings, the operation of the copper and manganin elements is illustrated schematically. As here shown, the manganin and copper elements of the bridge are replaced by a pair of parallel-connected resistance elements 43 and 44 of the same material and having equal temperature coefficients of resistance. At the balance temperature, the movable pointers 45 and 46 of the source 35 of E. M. F. are connected to the midpoints of the resistors 43 and 44, the conductors of advance metal and of copper leading to the cold junction 15 of the thermo-couple being permanently connected to the galvanometer points 41 and 42 of the Wheatstone bridge.

So long as the temperature of the bridge remains at a base temperature, say 30 degrees C., the movable terminals 45 and 46 should make connection with the bridge at substantially the mid-point of the resistance elements 43 and 44, as illustrated. If the temperature of the cold junction and that of the resistance elements 43 and 44 increase to say 35 degrees C., or to any higher temperature, and in order that the instrument 13 shall indicate the actual temperature of the hot junction 12, the pointer 45 must be moved to the left and the pointer 46 to the right of their central position, as illustrated by the broken lines. Thus, an E. M. F. is impressed upon the cold-junction terminals 15 and 16 that compensates for the reduction in E. M. F. between the hot and cold junctions of the thermo-couple resulting from the reduced temperature therebetween.

If the temperature of the cold junction falls below the base temperature, say to a value of 25 degrees C., or lower, the terminal 45 must be moved to the right and the terminal 46 to the left of the central position. Thus, an E. M. F. is impressed across the terminals 41 and 42 that subtracts from the total E. M. F. generated between the hot and cold junctions of the theremo-couple, so that the instrument 13 indicates still the temperature of the hot junction 12.

Since the device illustrated in Fig. 4 must of necessity be manual in its operation, automatic compensation for variations in cold temperature cannot be obtained. However, by subdividing the resistance elements 43 and 44 into separate elements of equal resistance, but having different temperature coefficients of resistance, automatic compensation for variations in cold-junction temperature may be obtained.

By experiment, it has been determined that the error in degrees entering into the indications of the instrument 13, caused by variations in the voltage of the source 35 of E. M. F., is substantially equal to the percentum variation in voltage multiplied by the difference between the base temperature, say 30°, and the ambient temperature surrounding the cold junction of the thermo-couple. For example, if the ambient temperature is 20°, and the change in voltage of the source 35 of E. M. F. is 10%, then the error affecting the reading of the instrument 13 will be .1×10° or 1°. Thus, it is evident that the accuracy of the indications of the instrument 13 is affected so slightly that, for ordinary purposes, the temperature indications may be taken to be the true temperatures of the hot junction 12.

By my invention, I have provided a direct indicating thermo-electric temperature-measuring device that embodies a thermo-couple, an electric instrument connected in circuit therewith and a cold-junction temperature-corrective means connected in series circuit with the thermo-couple circuit, whereby the instrument indicates, at all times, the temperature of the hot junction, regardless of variations in the cold-junction temperature.

Various modifications may be made in the device embodying my invention without departing from the spirit and scope thereof. I desire, therefore, that only such limitations shall be placed thereon as are imposed by the prior art and the appended claims.

I claim as my invention:

1. A temperature-measuring instrument comprising a Wheatstone bridge in which the sides have resistance elements of high and low temperature coefficients of resistance, respectively, a source of E. M. F. connected between two points of the bridge, a thermo-couple having its cold-junction connected to the bridge, an electrical instrument connected in circuit with the thermo-couple, and heat-storage means thermally associated with the bridge for rendering changes in temperature of the cold junction and the bridge sluggish.

2. A temperature-measuring instrument comprising a Wheatstone bridge in which the sides have resistance elements of high and low temperature coefficients of resistance, respectively, a source of constant E. M. F. connected between two points of the bridge, a thermo-couple circuit connected across two other points of the bridge, an electrical instrument connected in circuit with the thermo-couple, and a highly conductive heat-storage member connected to said bridge and the cold junction of said thermo-couple.

3. In a temperature-measuring instrument of the direct-indicating type, two opposing circuits, a portion of each circuit being common, one circuit including a source of substantially constant E. M. F. and a bridge resistance, the other circuit including said bridge resistance and a thermo-electric couple, the cold junction of the thermo-couple being connected to the bridge and having such relation therewith that there shall be a difference in potential developed by the bridge and impressed on a circuit including the thermo-couple for balancing the cold-junction electromotive force generated thereby when the temperature of said bridge resistance and cold junction departs from that of a predetermined value, and a heat-storage member thermally connected to the cold junction of said thermo-couple and to said bridge resistance, whereby changes in temperature of said bridge resistance and cold junction are rendered sluggish.

4. A temperature-measuring instrument of the direct-indicating type comprising a metallic member, a Wheatstone bridge, in which the sides have resistance elements of high and low temperature coefficients of resistance, respectively, said bridge being wound on said member, means for electrically insulating said bridge from said metallic member, a source of constant E. M. F. connected between two points of the bridge, means for connecting one of the galvanometer points of said bridge to said metallic member and a thermo-couple having its cold junction secured to said metallic member.

5. A temperature-compensating device for the cold junction of a thermo-couple, said device comprising a heat-storage member and a Wheatstone bridge wound therearound, means for electrically insulating said bridge therefrom, the sides of said bridge comprising resistance elements having high and low temperature coefficients of resistance, respectively, said bridge having one point thereof that is common to two of said resistor elements of dissimilar temperature coefficients of resistance connected to said heat-storage member.

6. A temperature-compensating device for the cold junction of a thermo-couple, said device comprising a metallic member having high thermal capacity and a Wheatstone bridge wound therearound, means for electrically insulating said bridge from the metallic members, the sides of said bridge comprising resistance elements having high and low-temperature coefficients of resistance, respectively, said bridge having one point thereof that is common to two of said resistor elements of dissimilar temperature coefficients of resistance connected to said metallic member.

7. The combination with a thermo-couple having hot and cold junctions, of means connected to said cold junction for compensating automatically for variations in temperature of the cold junction, said means comprising a heat-storage member and a Wheatstone bridge wound therearound, means for electrically insulating said bridge from the heat-storage member, the sides of said bridge comprising resistance elements having high and low temperature coefficients of resistance, respectively, said bridge having one point thereof that is common to two of said resistor elements of dissimilar temperature coefficients of resistance connected to said heat-storage member, said cold junction comprising one conductor of said thermo-couple and said heat-storage member.

8. The combination with a thermo-couple having hot and cold junctions, of means connected between the terminals of said cold junction for compensating automatically for variations in the cold-junction temperature, said means comprising a metallic member and a Wheatstone bridge wound therearound, means for electrically insulating said bridge from the metallic member, the sides of said bridge comprising resistance elements having high and low temperature coefficients of resistance, respectively, said bridge having one point thereof that is common to two of said resistor elements of dissimilar temperature coefficients of resistance connected to said metallic member, said cold junction being electrically connected to said metallic member.

9. A temperature-measuring instrument comprising an electrically conducting heat-storage member, a Wheatstone bridge wound thereon, means for electrically insulating said bridge from the heat-storage member, the sides of said bridge having resistance elements of high and low temperature coefficients of resistance, respectively, a source of E. M. F. connected to said bridge, a thermo-couple having the cold junction thereof connected to one of the galvanometer points of said bridge, means for connecting said cold junction and that point of the bridge to which it is connected to the said heat-storage member and an electrical instrument connected in circuit with the thermo-couple.

10. The combination with a thermo-couple having hot and cold junctions, of a heat-storage member having a relatively high thermal capacity, a Wheatstone bridge, in which the respective sides have resistance elements of high and low temperature coefficients of resistance, respectively, disposed compactly about said member, means for electrically insulating said resistance elements from said heat-storage member, said bridge being connected to the cold junction of said thermo-couple and means for connecting one point of said bridge to said heat-storage member, whereby changes in temperature of said bridge are rendered sluggish.

In testimony whereof, I have hereunto subscribed my name this 31st day of March, 1927.

FERNALD S. STICKNEY.